No. 895,306. PATENTED AUG. 4, 1908.
W. H. RUSSELL & C. ECKLAND.
VALVE.
APPLICATION FILED JAN. 17, 1906.
2 SHEETS—SHEET 1.
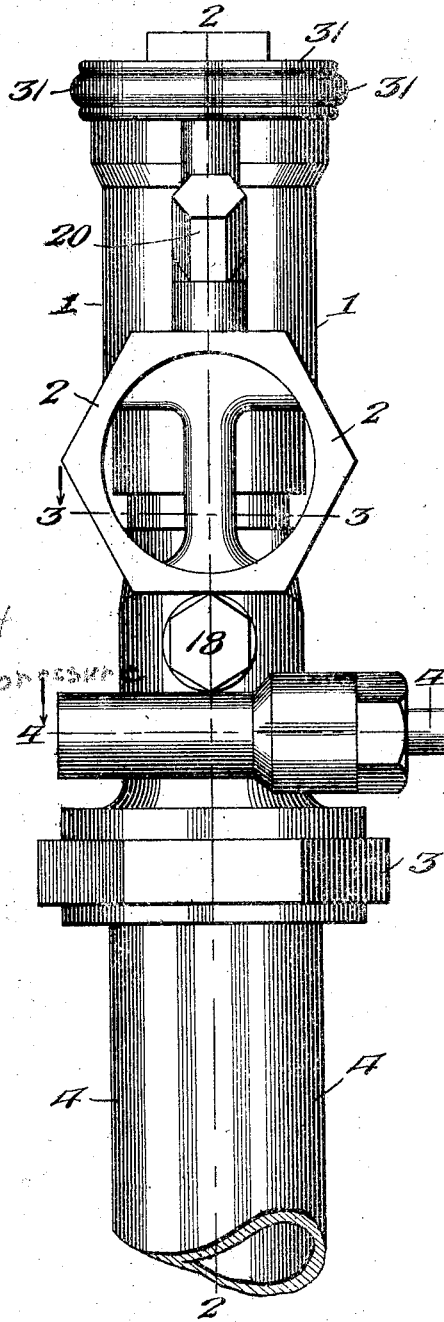
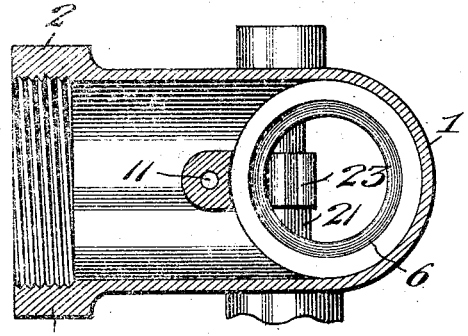
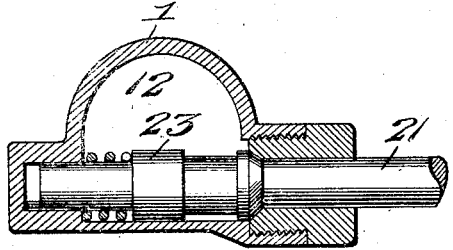
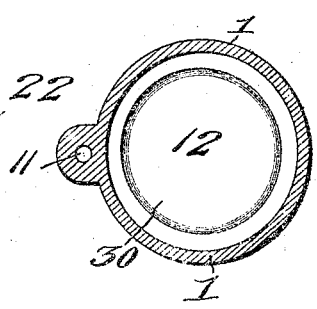
Witnesses
Frank B. Hoffman
J. A. Elmor
Inventors
W. H. Russell and
Charles Eckland
By Victor J. Evans
Attorney No. 895,306. PATENTED AUG. 4, 1908.
W. H. RUSSELL & C. ECKLAND.
VALVE.
APPLICATION FILED JAN. 17, 1906.
2 SHEETS—SHEET 2.
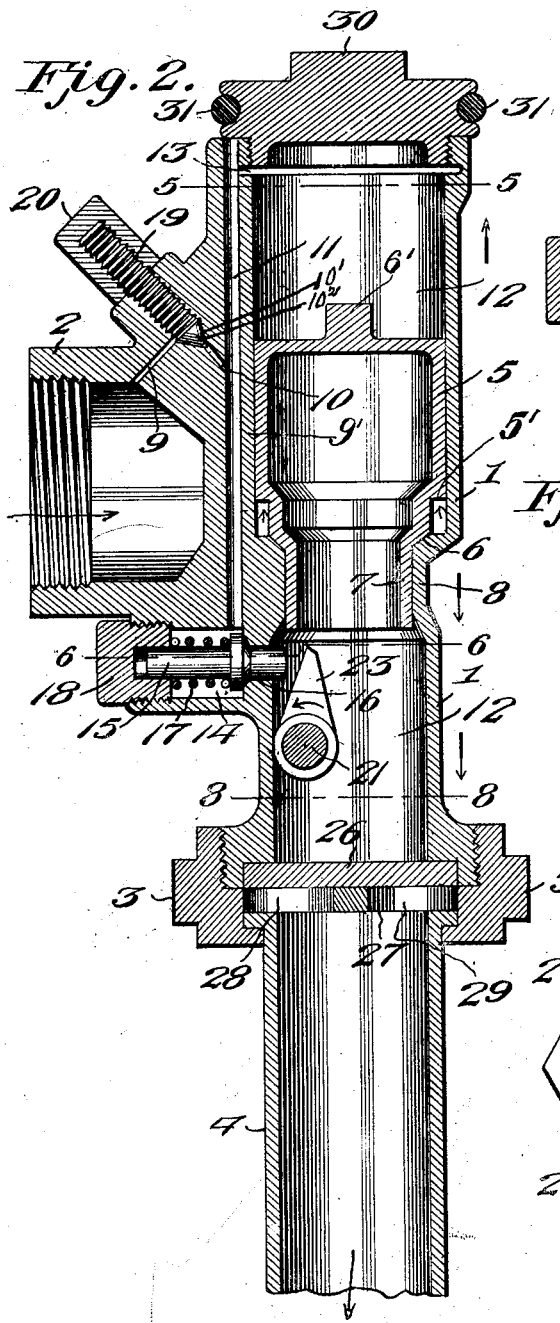
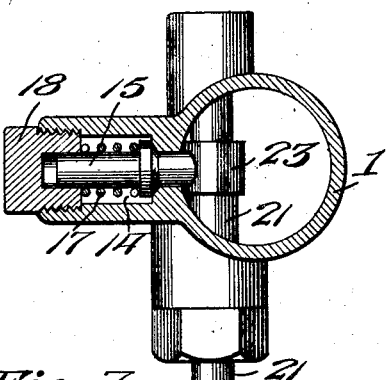
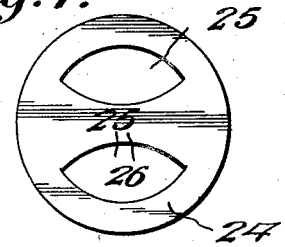
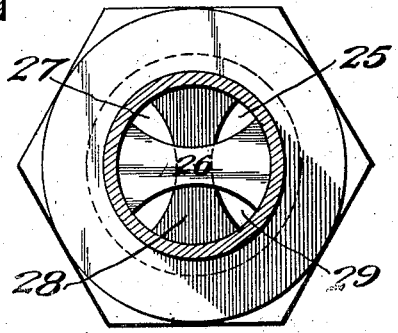
Witnesses
Frank B. Hoffman
Inventors
W. H. Russell and
Charles Eckland
By Victor J. Evans
Attorney

UNITED STATES PATENT OFFICE.

WILLIAM H. RUSSELL AND CHARLES ECKLAND, OF OAKLAND, CALIFORNIA.

VALVE.

No. 895,306.            Specification of Letters Patent.            Patented Aug. 4, 1908.

Application filed January 17, 1906. Serial No. 296,527.

*To all whom it may concern:*

Be it known that we, WILLIAM H. RUSSELL and CHARLES ECKLAND, citizens of the United States, residing at Oakland, in the county of Alameda and State of California, have invented new and useful Improvements in Valves, of which the following is a specification.

This invention relates to flushing valves and has for its objects to produce a comparatively simple, inexpensive device of this character which in practice will be moved automatically to open or closed position by the water pressure, one wherein the movement of the valve will be gradual and noiseless, and one in which the flow of water and the pressure on the valve may be regulated.

A further object of the invention is to provide a device of this character wherein the flushing water will be supplied directly from the main, thus dispensing with the usual tank, and one in which provision is made for an ample afterflow.

With these and other objects in view, the invention comprises the novel features of construction and combination of parts more fully hereinafter described.

In the accompanying drawings: Figure 1 is a view in elevation of a flushing apparatus embodying the invention and looking toward the inlet port. Fig. 2 is a vertical section taken on the line 2—2 of Fig. 1. Fig. 3 is a horizontal section taken on the line 3—3 of Fig. 1. Fig. 4 is a detail sectional view taken on the line 4—4 of Fig. 1. Fig. 5 is a detail section taken on the line 5—5 of Fig. 2. Fig. 6 is a horizontal section on the line 6—6 of Fig. 2. Fig. 7 is a detail view of one of the cut-off disks. Fig. 8 is a cross section taken on the line 8—8 of Fig. 2 and viewed in the direction of the arrow.

Referring to the drawings, 1 designates a vertical valve casing provided with a main inlet 2 adapted for connection with the water main and having coupled to its lower end by means of a nut 3 a discharge or flushing pipe 4, there being slidably disposed within the casing 1 a valve 5 designed to close upon a seat 6 and having above said seat a reduced portion forming a shoulder 5' and below the seat a stem 7 guided in a reduced portion or neck 8 provided on the casing at a point below the seat.

Leading from the tubular inlet 2 is a feed opening or passage 9 adapted to communicate through the medium of a second passage 10 with a vertical channel 11 formed in the casing 1 at one side of the valve chamber 12 and extending through a bridge piece 9' which extends across the inlet 2 without obstructing communication between the latter and the valve chamber, and having communication with the upper end of the latter through a port 13, said channel being arranged to communicate at its lower end with a valve chamber 14 in which is arranged a pilot valve 15 adapted for closing a port 16 leading to the chamber 12 at a point below the valve 5, said valve 15 the inner end of which projects through the port 16 into the lower portion of chamber 12 being normally pressed to closed position by means of a spring 17 having bearing at its outer end against a plug 18 threaded into and for closing the outer end of the chamber 14.

Tapped into the casing 1 at a point between the passages 9 and 10 and for controlling the latter is a pin valve 19 having applied to its outer end a projecting cap 20, while pivotally mounted in the lower portion of the valve chamber 12 is an operating member or shaft 21 provided with a handle 22 and having fixed thereon within the chamber 12 a projecting contact portion or finger 23 positioned to act upon the inner end of and for opening the valve 15.

We wish it to be understood that we provide a valve seat 10', at the intersection of the feed opening 9, and passage 10, to receive a valve $10^2$ on the inner end of the screw pin 19. Said valve serves to control the action of said feed opening and said passage.

Fixed in the lower end of casing 1 is a cut-off member or disk 24 having a pair of discharge openings 25 and a central web 26, while fixed in the nut 3 and for movement therewith is a corresponding cut-off member or disk 27, the central web 28 of which extends normally across and at right angles to the web 26 and the openings 29 of which are disposed diametrically at right angles to the openings 25; said disks 24 and 27 serving, in conjunction with each other, to restrict and regulate the outlet flow.

Tapped into the upper end of the casing 1 is a removable plug or closure 30 provided with a peripheral groove in which is seated an elastic ring 31 which projects beyond the perimeter of the casing and forms a cushion with which the cover of the bowl, not shown, comes in contact when raised.

The valve 5 has an upward projection 6' which when the valve is raised engages the plug or closure 30 to prevent the port 13 being obstructed by the upper end of the valve.

The operation of this invention will be readily understood from the foregoing description taken in connection with the drawings hereto annexed, and it may be briefly described as follows: when the valve 5 is seated it obstructs the flow from the inlet 2 through the lower part of the casing 1, the valve being, however, subject to upward pressure of the fluid entering through the said inlet 2 into the annular space between the shoulder 5' and the valve seat. At the same time, the fluid entering through the restricted inlet 9—10 into the upper portion of the valve chamber 12 presses against the upper surface of the valve which is thereby held firmly to its seat, the upward pressure being exercised upon an area which is much less than that which is subjected to a downward pressure. When the pilot valve 15 is displaced against the tension of the spring 17, communication is established between the upper portion of the valve chamber and the outlet; the valve, being thus relieved from downward pressure, will be forced upwardly from its seat by the fluid pressure against the shoulder 5', and the water will pass from the inlet 2 through the valve seat and the lower portion of the casing and to the flushing pipe 4. When pressure upon the pilot valve is relaxed, the latter will be forced to its seat by the spring 17, and the equilibrium of pressure being restored the valve will be re-seated by gravity aided by the pressure of the fluid slowly entering the upper portion of the valve chamber through the restricted passage 9—10.

This device, as will be seen, is very simple in construction, and the various ports and passages are so arranged that they may be very readily bored out from the casting which constitutes the casing of the device. The flushing will be rapidly and efficiently performed, and afterflow will practically be avoided.

By constructing the casing of the improved valve with the bridge piece 9' extending across the laterally extending inlet passage 2, the casting which constitutes the valve casing is materially braced and reinforced, and the bore constituting the passage 11 that connects the upper and lower ends of the valve casing may very conveniently be formed through said bridge piece which forms a brace extending diametrically across the inlet passage. The bores 9 and 10 constituting the angular passage which connects the inlet passage with the duct or passage 11 may also be very conveniently formed without materially weakening the casting constituting the valve casing.

The general construction of the device is simple, compact, and thoroughly efficient.

Having thus described our invention, what we claim is:

A valve comprising a casing with a valve seat having a sliding valve therefor, a main inlet on one side of the casing, a vertical channel having communication with a port at the upper end of the casing, a feed opening having communication with said inlet, a passage having communication with the said opening and said channel, a valve seat at the intersections of the feed opening and passage, a screw pin movably mounted in the casing and having a valve to contact with said intersecting valve seat, said valve serving to control the action of said feed opening and said passage, a spring actuated valve, a valve seat for the same at the lower end of the vertical channel, a shaft pivotally mounted in the lower end of the casing and having a finger therewith which serves to contact with the inner end of the spring actuated valve for opening its valve seat, substantially as specified.

In testimony whereof, we affix our signatures in presence of two witnesses.

WILLIAM H. RUSSELL.
CHARLES ECKLAND.

Witnesses:
A. M. KERSTAN,
GEO. W. REED.